Patent text

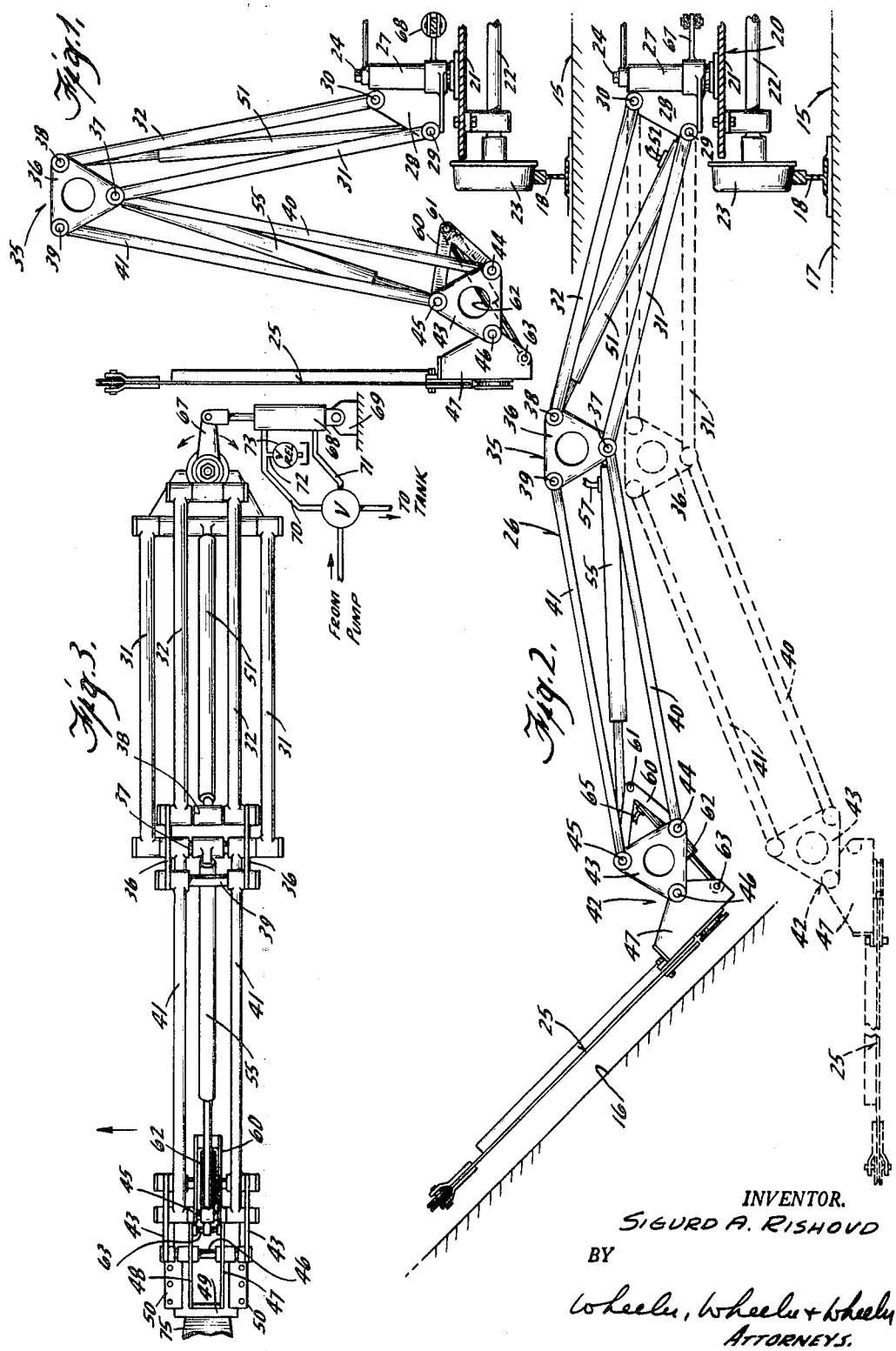

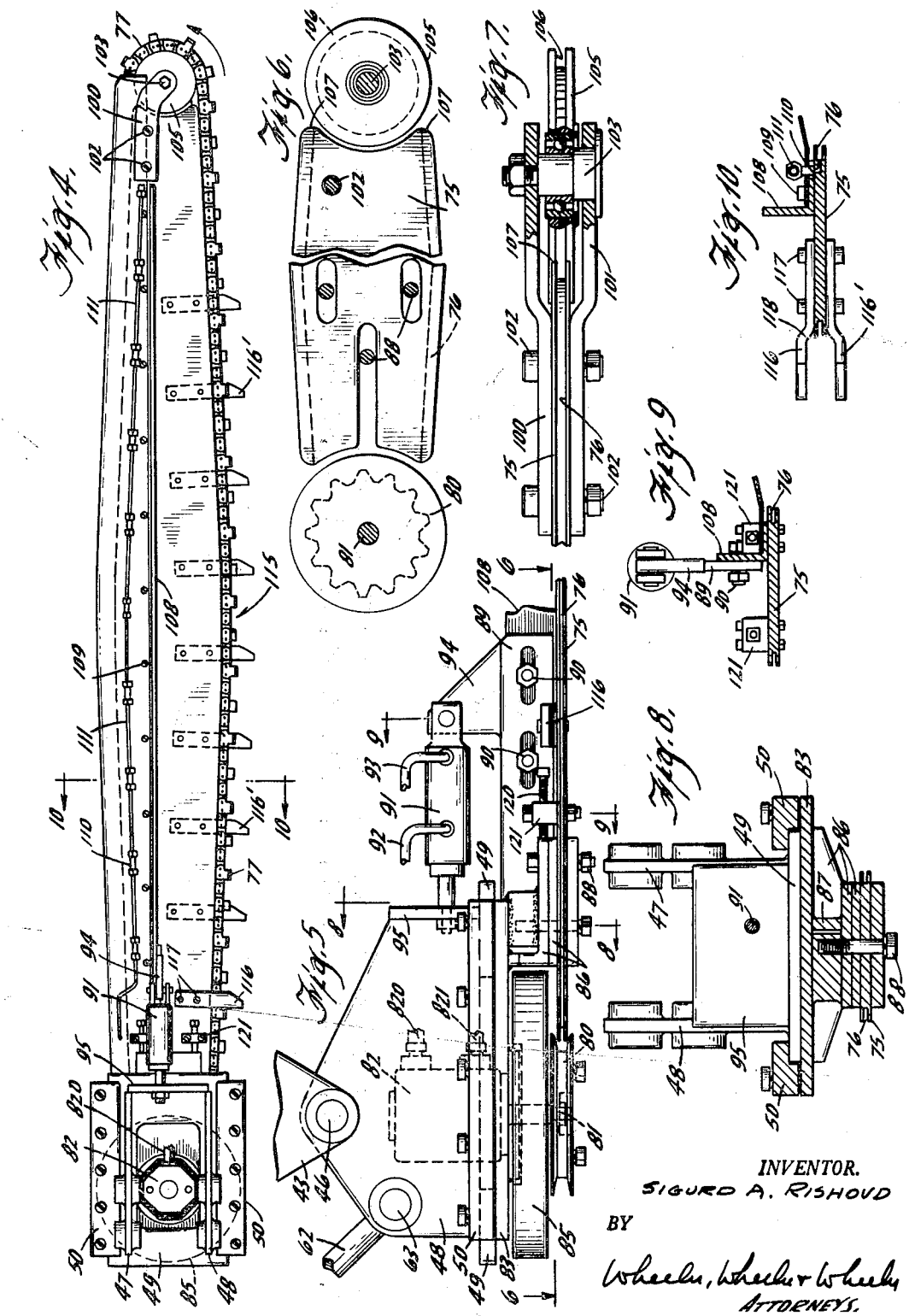

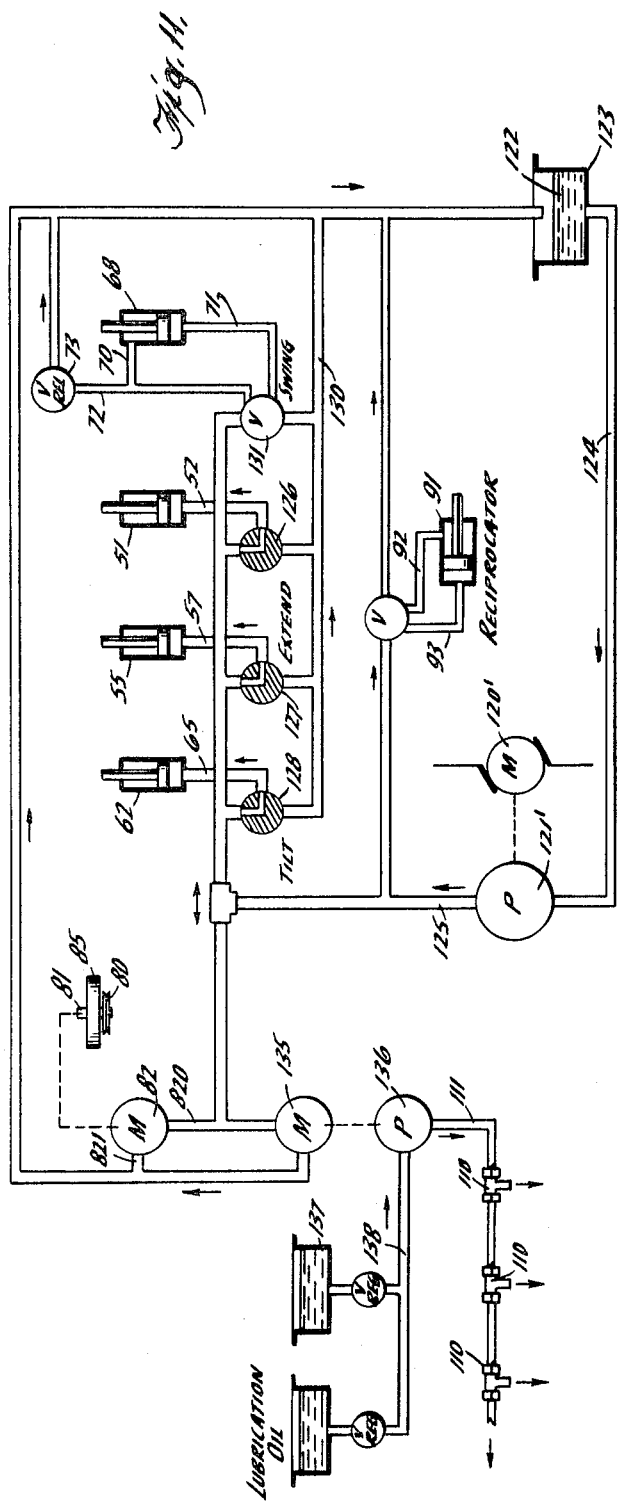

3,237,388
BRUSH CUTTING CHAIN SAW
Sigurd A. Rishovd, Golden Valley, Minn., and Richard W. Bailey Oak Park, and Maurice S. Reid, Glen Ellyn, Ill., assignors to Northwestern Motor Company, Eau Claire, Wis., a corporation of Wisconsin
Continuation of application Ser. No. 112,802, May 26, 1961. This application Apr. 2, 1965, Ser. No. 454,234
6 Claims. (Cl. 56—291)

This is a continuation of application S.N. 112,802 filed May 26, 1961 and now abandoned.

This invention relates to a chain saw and extensible mounting therefor.

Although the chain saw and vehicle mount and controlling devices described below with reference to this invention are disclosed in an assembly particularly adapted to the cutting of brush in a brush cutting operation such as would be encountered along the right-of-way of a railroad, it will be understood that the features of this invention are adaptable to chain saws and chain saw operation in a wide variety of environments.

More particularly stated, this invention relates to the mounting, lubrication, saw chain drive and chain saw guarding especially where the chain saw is of great length. Furthermore, this invention relates to a swing mount for outrigger extension of a chain saw, not only to provide an efficient easily controlled saw in outrigger position, but also to safeguard the operation of the saw should it meet an unusual obstruction not subject to saw penetration.

An additional feature of this invention is the provision in combination with a chain saw and special lubrication therefor, of means for disseminating treatment materials to effect herbicidal reactions with respect to the surfaces and growing things over which this equipment passes in carrying out the sawing operation.

One of the most important features of this invention is the provision and association of a flywheel with the driving member for the chain of a chain saw even where the motive force comprises a substantially pulsationless motor upon the flywheel and chain drive shaft, since it has been found that a chain driven at a high rate of speed and under rigorous conditions in brush cutting tends to jump out of the guiding means for the chain of the chain saw unless such a flywheel is provided, and this is especially so where the chain saw is of large dimensions.

In the drawings:

FIG. 1 is an elevation of the folded or retracted brush cutting chain saw mounted to a railway car, the car and a portion of the rail and roadbed being shown fragmentarily and in vertical section.

FIG. 2 is a view of the machine and apparatus of FIG. 1, but showing the chain saw mount extended to operate over an inclined portion of the right-of-way, a foreshortened and adjusted view of the chain saw with its mount in a slightly different position being shown in dotted lines.

FIG. 3 is a plan view of the apparatus shown in FIG. 2, but omitting the rail car.

FIG. 4 is a plan view of the chain saw and its immediate motor drive and adjustable mount parts.

FIG. 5 is an elevation showing that portion of the chain saw and reciprocative mounting parts adjacent the power end of the saw.

FIG. 6 is a foreshortened plan view of the chain saw bar and the sprocket and pulley at the ends thereof, showing the relationship of the respective ends of the bar as juxtaposed to said sprocket and pulley.

FIG. 7 is an elevation of the outer end of the chain saw bar and the mounting clevis for the pulley, portions of the clevis and bearing for the pulley being shown in section.

FIG. 8 is a section on line 8—8 of FIG. 5.
FIG. 9 is a section on line 9—9 of FIG. 5.
FIG. 10 is a section on line 10—10 of FIG. 4.
FIG. 11 is a diagrammatic arrangement of the fluid connections for the operation of the various fluid pressure motors, lubrication, oil distribution and distribution of treatment materials such as herbicide.

As indicated above, this invention is shown in an environment where, as shown in FIG. 2, a roadbed 15 and adjacent embankment 16 of railroad right-of-way with its usual railroad tie 17 and rail 18 provide a railway upon which a verhicle 20 may progress. Sufficient structure of the vehicle is shown to indicate a flat bed 21 supported upon an axle 22 equipped with the usual flanged wheel 23 so that it shows the vertical post 24 rigidly supported by the flat bed of the vehicle upon which the chain saw mount is carried and adjustably supported. The purpose of the apparatus shown principally in FIGS. 1, 2 and 3 is the support, manipulation and operation of the large chain saw 25, shown in FIG. 2 in its outrigger position, and in FIG. 1 in its retracted position; but supported in all positions by a pantographic, extensible carrier 26.

Encompassing post 24 with a large tubular bearing 27 is a pantograph base 28 swingable about the post 24 and provided with vertically spaced base shafts 29 and 30, respectively for lower and upper pantograph parallel arms 31 and 32 of which there may be a sufficient number of each and of sufficient size and strength to support the outrigger members and saw in their extended positions. These parallel arms 31 and 32 extend to a pantograph articulation elbow assembly 35 provided with spaced plates 36. These plates carry not only the shafts 37 and 38 for the lower arms 31 and upper arms 32 at their points of connection to the plates 36, but also provide shaft 39 so designed that parallel outridgger arms 40 (lower) and 41 (upper) may be articulately swingable and connected to chain saw carrier assembly 42. This outrigger assembly has plates 43 somewhat comparable to plates 36 to provide mounting means for shafts 44 and 45 to which the parallel arms 40 and 41 are swingably connected. Also, plates 43 carry shaft 46 upon which reciprocator mounting plates 47 and 48 are pivotally mounted, and it is upon these plates 47 and 48 that a reciprocator plate 49 is provided to be engaged by a set of ways 50 (see FIG. 8) forming a part of the chain saw assembly described below for carriage of the chain saw 25 in such manner that the saw chain may be readily reciprocated parallel to its longitudinal axis.

Extending between shaft 29 and shaft 38 diagonally across the parallelogram arrangement of lower arms 31 and upper arms 32 and pivotally related to each of said shafts, a hydraulic ram assembly 51 is provided with appropriate hydraulic connection shown diagrammatically at 52. Somewhat similarly, between shaft 37 and shaft 45 diagonally across the parallel arrangement of lower arms 40 and upper arms 41, is provided a hydraulic ram assembly 55 provided with suitable hydraulic connection at 57 for the control thereof, and it will be noted that a linkage arrangement 60 to carry a shaft 61 is provided so that a hydraulic ram 62 may extend between shaft 61 and a pivotal connection with the reciprocator mounting plates 47 and 48 at 63. This hydraulic ram 62 has suitable hydraulic connection at 65 for the control thereof, thus completing a pantograph arrangement under hydraulic control for extending the chain saw 25 from the position shown in FIG. 1 to an outrigger position such as that shown in FIG. 2. In any one of the intermediate positions, the saw may be given an angular position such as that indicated between the dotted line position in FIG. 2 and that shown in full lines in FIG. 1 as will readily be understood. Each of the pantograph operations is gravity operated in one direction.

Also, I have provided a pantograph base swing control device as shown most clearly in FIG. 3 where it will be seen that a pantograph swing arm 67 rigidly secured to base 28 may be actuated to rotatably swing the entire pantograph assembly about the vertical axis of shaft 24. For this purpose a hydraulic ram assembly 68 based at 69 upon a connection with the car bed 21 with appropriate hydraulic connections at 70 and 71 for the control of such swinging motion, is provided. Also, a relief valve and suitable connections at 72 provide for safety release of excessive pressure when the saw or the pantograph mechanism strikes an obstruction.

Thus as the vehicle 20 progresses along the railway right-of-way 15–16 and the contours of the right-of-way such as those shown at 16 are encountered, the extension of the pantograph from the position shown in FIG. 1 to that shown in full lines in FIG. 2 will dispose chain saw 25 in a desired relation to the right-of-way; and as will be described below, the various saw operation problems which may exist with respect to any portion of the path of progress of the saw may be taken care of by the operator through his controls of his hydraulic means and the various saw means now to be described.

Chain saw assembly 25 for chain saw operation under circumstances where the saw must operate "in the rough" and in an outrigger position referred to above, must be of a construction quite different from that customarily acceptable where the saw assembly is smaller, shorter, less rugged and designed to encounter less rigorous cutting conditions. Starting basically with a saw bar 75, the bar which was found most acceptable for brush cutting and right-of-way clearing is a seven foot bar as to length and ten inches in width at its widest mid-portion. It is provided with a chain groove 76 which is 7/16 inches deep in which the guide wings of the respective links of chain 77 are guided. These guide wings are of such dimensions as to extend almost to the bottom of the groove. It has been found that the particular chain 77 suitable for this type of work is a three-quarter inch pitch chain and despite the fact that this chain is exceedingly rugged and is stretched about its driving and guide sprocket and about its pulley, respectively, there is a tendency for the chain to jump out of the groove 76 under ordinary operating conditions unless special provisions are made, structurally, to obviate this difficulty. Whereas the normal operating speed for a three-quarter inch chain would be expected to be 1200 feet per minute to accomplish normal saw operations, it is necessary to speed up the chain at least to 3,000 feet per minute and preferably 4,000 feet which marks a most important departure from previous practices in the chain saw art. In keeping with this markedly higher speed of operation, operation in rough cutting conditions, and operation at a distance from the operator, features of construction different from ordinary practices have been found necessary.

Saw bar 75 is equipped at its power drive end with a chain drive sprocket 80 aligned with the groove 76 and mounted upon output power shaft 81 of a hydraulic motor 82. This motor is secured to motor plate 83, and since this plate is wider than reciprocator plate 49, the set of ways 50 is secured to this plate shown in FIG. 8. Reciprocator plate 49 has a generally oblong opening so that the motor 82 extends upwardly through such opening, and allows the reciprocation of the plate 49 relative to motor 82.

Below the motor 82 and plate 83 there is sufficient shaft length for a flywheel 85 fixed on the shaft 81 intermediate sprocket 80 and the motor.

Out along the bar 75 in spaced relation to the inboard end of said bar are spacer members 86 which, with boss 87 forming part of motor plate 83, provide means for securing the saw bar to motor plate 83 through the use of cap screws 88; and since boss 87 has an outwardly extending reciprocator frame 89 parallel to what may be termed the backbone of the saw bar 75, means are provided by a bolt and slot connection at 90 for adjustment of the saw bar respecting sprocket 80 when the cap screws 88 are loosened. Chain tightening is thus facilitated.

Also, it will be noted as indicated in FIGS. 5 and 9 that a reciprocator motor 91 comprising a hydraulic ram construction with appropriate hydraulic connections at 92 and 93 is interconnected between an upper extension 94 of reciprocator frame 89 and an upper extension at 95 of a reciprocator plate extending laterally between plates 47 and 48, thus making it possible for the operator, under hydraulic operation of motor 91, to cause the bar 75 and its associated chain driving parts to reciprocate in and out upon the ways 50.

At the outer end of bar 75 is a two part clevis made up of two offset members 100 and 101 clamped on their respective faces of the saw bar as shown in FIG. 7 by bolts 102 and thus providing with idler pulley shaft 103 and an appropriate mounting means for the bearing of idler pulley 105 grooved at 106 for the saw chain 77. It will be noted that the end of bar 75 is shaped complementarily to idler pulley 105 with blunt nose configuration at 107 so that the groove 76 of saw bar 75 merges cleanly with idler pulley 105 to prevent the gathering of chips and debris at this crucial point in the continuity of the chain groove.

Reference has been made to the fact that saw bar 75 has a backbone. This is shown at 108 and comprises an angle member secured at frequent intervals to the saw bar by means of cap screws 109, not only to provide a stiffener for the long saw bar, but also to provide guard means for the chain and chain groove lubrication provided by multiple oil feeder pipes 110 served with lubricating oil from a main oil supply and pressure line 111 described below. It will be noted that the forward or working edge of the saw bar is along the edge indicated at 115 and that the chain moves in the direction indicated by the arrow in FIG. 4. This means that the backbone 108 is in protective relation to the lubricant supply line 111 as to any cut members or debris resulting from the operations of the saw.

At spaced points along the forward margin of the saw bar are stop guards 116 and 116' secured to the saw bar by cap screws 117. The guard 116 is secured to the top surface of the bar and the other guards 116' are secured to the bottom surface. It will be noted that the stop guards are so shaped (see FIG. 10) with an abrupt curve in the guards at 118 as to provide no pocket for collection of sawdust or debris between the guards and the path of travel of the chain. These guards prevent stalks, twigs and flexible shrubbery from resiliently evading the sawing action of the saw chain. Stop guards are spaced apart sufficiently (on eight inch centers) to prevent the escape of any material which the saw is expected to cut.

In preparing for the operation of the above described equipment, the chain 77 is placed about sprocket 80, about idler pulley 105 and along the groove 76 of saw bar 75 whereupon the chain is tightly adjusted by means of tightener screws 120 extending through tightener blocks 121 and against spacer members 86. Then cap screws or bolts 88 are tightened in readiness for chain operation. The tightening of these bolts and screws 88 has provided a completely stiffened outstanding relationship of the bar 75 respecting the ways 50, and the reciprocator plate 49 snugly fitted in the ways and connected to pantograph mounting determines that the operator can place the saw bar in any outrigger position. For instance, if the surface to be traversed by the saw blade is substantially horizontal, the operator through the controlled feeding of liquid under pressure to the connections at 52, 57 and 65 will place the saw bar as shown in dotted lines in FIG. 2. If the material to be cut by the saw is of such characteristics as to call for reciprocation of the complete saw bar under control of hydraulic assembly 91, the operator will then operate a valve for alternate extension and reversal of the hydraulic mechanism at 91 to continuously provide endwise reciprocation of the saw bar and its motor-chain drive since it has been found that such constant reciprocation tends to clear the saw bar of any trailing debris and also tends to place cuttable material encountering the saw chain between the guards 116.

The motor 82 comprising a hydraulic high speed motor furnished with high pressure liquid through hydraulic connections 820 and 821 will provide a substantially pulsationless rotation of sprocket 80 for the chain 75. Mention has been made of the fact that this chain is not operated at the ordinary chain speeds of 1200 to 1500 feet of chain travel per minute, but is operated at 3,000 to 4,000 feet or even greater speed. Actually the groove 76 is 7/16 inch deep, and the guides for the links are almost to full depth of the groove. These unusually high speeds and the greater length of the chain saw as described above have been found to present phenomenal problems in that, despite the adjustment of the chain to a degree of tightness upon its sprocket and pulley greater than usual in chain saw practice, it will actually jump out of the groove and cause destructive operation of the saw unless flywheel 85 on the sprocket shaft 81 is provided. This flywheel, demonstrated repeatedly in test operations, is effective if an approximately forty-five pound flywheel is provided, and the tests have shown that a completely inoperative chain saw of the chain characteristics shown in the drawing, but omitting the flywheel 85 can be made into a perfectly reliable chain saw for all chain saw purposes including the most rugged right-of-way clearance if the flywheel is provided. This result is surprising because the motor 82 is inherently substantially pulsationless and the chain is as tight around its pulley and sprocket as can be expected to be practical in operation. Some marked assistance is also noticeable if a full complement of sprocket teeth is provided in sprocket 80.

While not shown in detail, there are complete hydraulic connections and valves for control of the various hydraulic ram type "motors" referred to above. The control system involves off and on valves to extend or retract the respective rams by means of liquid under pressure supplied from a source comprising a pump and reservoir. Special note is made, however, of the hydraulic ram assembly 68, which, as shown in FIG. 3, is provided with a by-pass at 72 with an automatic valve at 73. This automatic valve is so spring loaded as to permit the entire pantograph assembly to rotate in either direction if the pressure for a given directional movement exceeds a predetermined value. Thus, if the saw or any portion of the pantograph assembly encounters an obstruction which might be destructive of the equipment in the event that the car 20 continues to move, then the equipment may rotate about the shaft 24, and the attention of the operator will be attracted so as to cause him to stop the vehicle or remove the obstruction.

FIG. 11 shows diagrammatically the various fluid pressure elements and the connecting pressure and relief tubes for the operation of the entire apparatus, and in connection therewith it will be seen that there is a prime mover 120' driving a main pump 121' for supply of fluid 22 from sump 123 through conduit 124 on the low pressure side of the system into high pressure conduit 125. High pressure fluid from the conduit 125 is fed to hydraulic ram assembly 51 through connection 52; to hydraulic ram assembly 55 through connection 57; and to ram assembly 62 through connection 65. Thus through a pantograph extension valve 126 or 127 and through a tilt valve 128, the saw blade may be positioned at any angle or extent of movement laterally of the vehicle 20 as desired by the operator; it being understood that when the particular valve operated by the operator is moved to its "off" position, the high pressure fluid is relieved through exhaust line 130, and the fluid is returned to the sump 123.

Through valve 131, the operator may control hydraulic ram assembly 68 which is a double-acting assembly with an overload release described above.

High pressure fluid from conduit 125 is supplied to the saw motor 82 for the high speed operation of the saw as indicated above, and it is on the shaft 81 of this hydraulic motor 82 that the flywheel 85 is provided.

Then, too, since the vehicle 20 is operated by means of a hydraulic motor, there is a hydraulic motor at 135 connected, by means not shown, to the axle 22 and wheel 23 of the vehicle 20.

Description has already been provided for the lubrication connections through connection 110 at spaced points along the groove 76 of the saw bar 75. These connections 110 are shown in FIG. 11, but as disclosed in FIG. 11, it will be noted that the motor 135 drives a special pump 136 which is supplied not only with lubricating oil as shown, but is provided with connections to a reservoir 137 which supplies fluid treatment material or herbicide to the same supply line 138 which supplies pump 136 with lubricating oil.

In this connection, it has been noted that the high speed movement of the chain 77 in the particular groove requires a considerable supply of lubricating oil and that this lubricating oil is disseminated in an oily "fog" trailing from the saw assembly. It is possible to supply fluid treatment material or herbicide to the oil supply line 138 which serves to feed the lubrication to the pump 136 and thus accomplish a sawing operation, and also a service and vegetation treatment over the area serviced by this equipment. Suitable valves as shown for control of the lubricating oil and for the fluid treatment reservoir 137 are provided.

We claim:

1. A brush cutting chain saw for operation at speeds above 3000 lineal feet per minute and comprising a saw bar having a groove along two edges thereof, a peripherally grooved idler pulley rotatably mounted on and adjacent to and set partially into an end of the saw bar, a saw chain for running in the bar groove and having cutting teeth outside of the bar groove and running over the idler pulley, a peripherally grooved drive sprocket for the saw chain and located adjacent to and set partially into the other end of the saw bar, the diameter of the idler pulley and the largest diameter of the sprocket teeth being substantially equal respectively to the width of the saw bar adjacent the idler pulley and the drive sprocket for aiding in keeping the saw chain in the bar groove at said chain speeds, a substantially pulsationless fluid pressure motor mounted on the saw bar and having a shaft extending through the saw bar for mounting thereon of the drive sprocket in alignment with the saw bar grooves, and a flywheel of the order of 45 lbs. in weight mounted on the motor shaft for rotation with the drive sprocket and smoothing out of any residual pulsation of the motor.

2. The brush cutting chain saw of claim 1 in which the drive sprocket has a maximum tooth diameter larger than the width of the saw bar between the grooves adjacent the sprocket whereby the saw chain runs on the sprocket teeth for more than one-half the circumference of the sprocket.

3. The brush cutting chain saw of claim 1 in which the idler pulley maximum diameter relative to the root width of the saw bar and the positioning thereof relative to the said one end of the saw bar are such as to cause the saw chain to engage only approximately one-half of the circumference of the idler pulley and change in saw link mutual relationship and collection of chips under the chain is minimized.

4. The brush cutting chain saw of claim 1 in which plural tines are fixed on the saw bar to extend transversely thereof and beyond the cutting run of the chain only, a single tine being placed above the saw chain adjacent the beginning of the cutting run thereof and plural tines being placed below the saw chain in spaced relation along somewhat more than the middle half of the cutting run of the saw chain, the tine portions outwardly of the saw chain being offset from the sides of the saw chain.

5. A brush cutting chain saw comprising a peripherally grooved saw bar, a chain saw sliding in the saw bar groove, the saw bar groove providing a cutting forward run and a non-cutting return run for the saw chain, a stiffener member extending substantially the full length of the saw bar and approximately midway of the width thereof, and conduit means located behind and below the top edge of the stiffener for protection thereof against heavy brush falling on the conduit means, the conduit means being connected at a plurality of spaced points with and substantially along the entire return run of the groove for discharge of oil and herbicide over substantially the entire width of the swath behind the chain saw as it is moved forward.

6. A brush cutting chain saw for operation at speeds above 3000 lineal feet per minute and comprising a saw bar having grooved peripheral edges, a peripherally grooved idler pulley rotatably mounted on and set partially into one end of the saw bar, a saw chain running in the bar groove and over the idler pulley, a plate adjustably secured to the saw bar in parallel relation thereto for carrying the saw, a mount for reciprocably carrying the plate, motor means acting between the mount and the saw bar for reciprocating the entire saw, a saw drive motor mounted on the plate and having a shaft extending at right angles to the saw bar and through the centerline thereof, a saw chain drive sprocket mounted on the motor shaft adjacent the other end of the saw bar and with the sprockets in alignment with the grooves, a flywheel on the saw drive motor shaft adjacent the drive sprocket, and screw means mounted on the saw bar and bearing endwise on the plate for adjusting the position of the saw bar longitudinally of the plate and adjusting the tautness of the saw chain on the saw bar.

References Cited by the Examiner

UNITED STATES PATENTS

| | | | |
|---|---|---|---|
| 710,838 | 10/1902 | Brines | 143—32 |
| 1,123,783 | 1/1915 | Muir | 143—32 |
| 2,351,740 | 6/1944 | Blum | 143—32 |
| 2,603,249 | 7/1952 | Lawrence | 143—43 |
| 2,642,901 | 6/1953 | Hayden | 30—167 |
| 2,674,279 | 4/1954 | Wilson | 143—43 |
| 2,698,034 | 12/1954 | Jakku | 30—167 |
| 2,746,492 | 5/1956 | De Hardit | 143—32 |
| 2,765,823 | 10/1956 | Kneifl | 143—32 |
| 2,815,048 | 12/1957 | Davis | 143—32 |
| 2,845,967 | 8/1958 | Hutchinson | 143—32 |
| 2,878,633 | 3/1959 | Mullin | 56—25.4 |
| 2,891,586 | 6/1959 | Wright | 143—32 |
| 2,905,209 | 9/1959 | Gundmundsen | 143—135 |
| 2,913,020 | 11/1959 | Nielsen | 143—32 |
| 2,962,061 | 11/1960 | Nielsen | 143—32 |
| 2,973,615 | 3/1961 | Yaremchuk et al. | 56—229 X |
| 2,992,660 | 7/1961 | Merz | 143—32 |
| 3,006,129 | 10/1961 | Sayre | 56—292 |
| 3,043,079 | 7/1962 | Aston | 56—290 |
| 3,044,506 | 7/1962 | Oehrli | 143—32 |

FOREIGN PATENTS

| | | |
|---|---|---|
| 472,063 | 3/1951 | Canada. |
| 756,690 | 9/1933 | France. |

ABRAHAM G. STONE, *Primary Examiner.*

RUSSELL R. KINSEY, *Examiner.*